July 26, 1932. N. T. ASH 1,868,488
FRAME FOR SCREENING AND THE LIKE
Filed Oct. 30, 1930
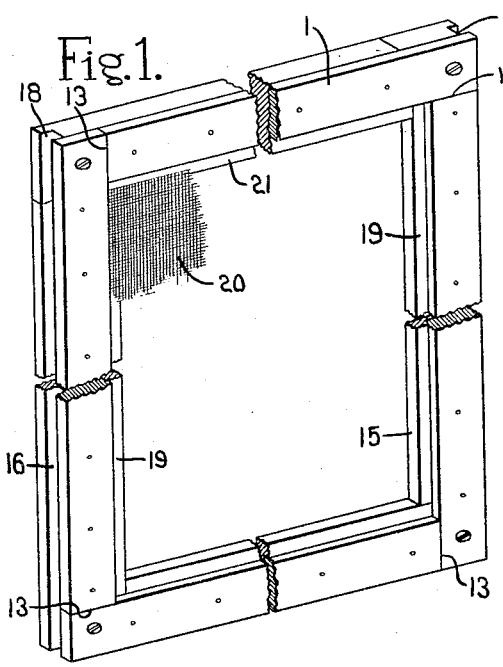
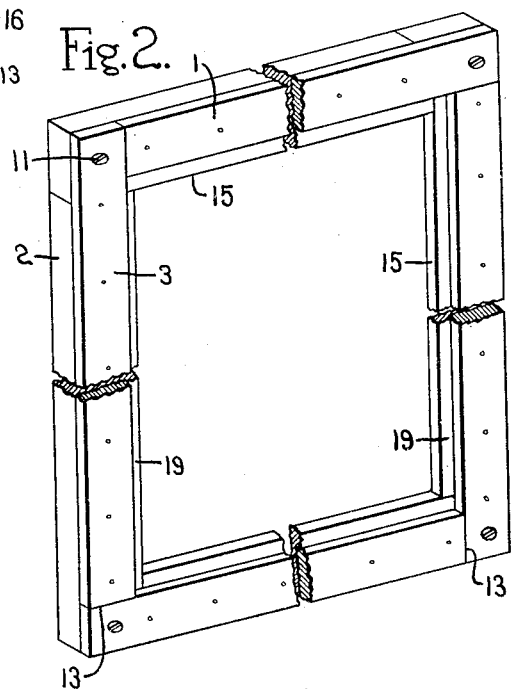
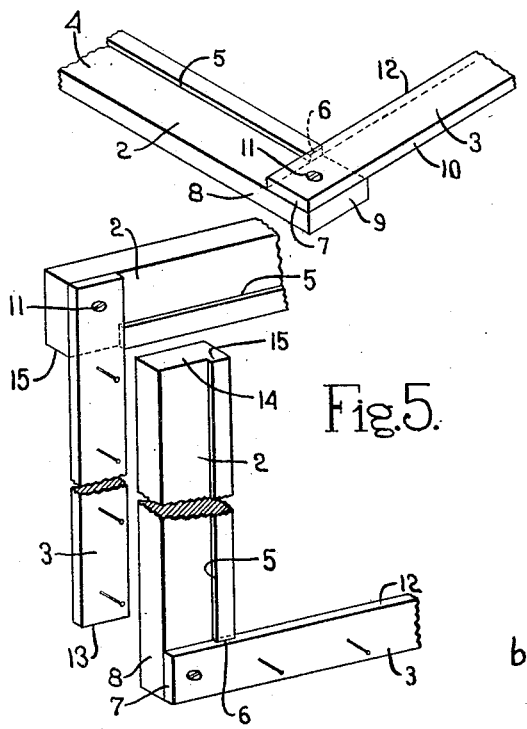
Inventor.
Nelson T. Ash
by Heard Smith & Tennant
Attys.

Patented July 26, 1932

1,868,488

UNITED STATES PATENT OFFICE

NELSON T. ASH, OF SAUGUS, MASSACHUSETTS

FRAME FOR SCREENING AND THE LIKE

Application filed October 30, 1930. Serial No. 492,212.

This invention relates to frames to which screening or other material may be secured and particularly to that type of frame which is sold in knock-down form to be assembled by the purchaser.

The principal object of the invention is to provide a frame of the type suggested which may be readily assembled by a person with a very slight knowledge of carpentry and with a few ordinary hand tools such as a hammer and a saw.

A further object of the invention is to provide a plurality of square-cornered elements which when assembled form an accurate and rigid frame.

A further object of the invention is to provide a frame of the knock-down variety composed of four-corner members which have overlapping and interlocking engagement with each other when assembled to produce a perfectly rectangular laminated frame structure.

Other objects and features of the invention will more fully appear from the following description in connection with the accompanying drawing, and will be particularly pointed out in the claims.

The invention contemplates preparing four similar corner members which when properly assembled form a complete frame. Each corner member is composed of two leg portions, one of which is preferably thicker than the other. The two leg sections are secured together at right angles. A transverse shoulder on one of the leg sections is positioned to bear against the inside face of the other leg section to insure a maximum strength of the corner joint and to maintain the right angle relation of the two leg sections.

Each leg section is cut to the proper length to determine the desired outside dimension of the screen when four corner members are assembled with adjacent leg sections completely overlying one another. The corner members are secured in overlapping relation by driving brads or other fastening devices through the overlapping leg sections.

In the drawing:

Fig. 1 is a perspective view of a completed frame embodying the invention and showing grooves at the sides thereof to provide for sliding a frame within a window casing or other structure where it may be desired to raise or lower the screen.

Fig. 2 is a perspective view of a completed frame suitable for permanently securing in place.

Fig. 3 is a perspective view showing the method of joining the leg sections of a corner member as used in the construction of the frame shown in Fig. 2.

Fig. 4 is a perspective view of a portion of one of the corner sections used in the construction of the frame shown in Fig. 1.

Fig. 5 is a detail view showing the method of assembling the same.

A frame as constructed according to the present invention is of maximum strength and so designed as to resist distortion and breaking down of the corner joints. The most difficult operation in the construction of an efficient frame is the construction of the corners of the frame to withstand the strains imposed thereon. The present invention contemplates the construction of the corner joints at the manufacturing point where such work may be done rapidly and efficiently. A frame constructed under the principles of the invention may be adapted to the construction of windows or may be employed as a frame to be covered with fabric or netting of any desired character. Its widest use is in the construction of frames to receive screening.

When a dwelling house or other structure is to be equipped with screens it becomes an expensive item when such work is done by a carpenter or when they are built at a manufacturing point. If the owner of the house or other building has available the means of constructing his own screen frames with a minimum of effort and a slight knowledge of carpentry, he may build his own frames and thereby eliminate a large part of the labor cost.

The great majority of frames of the knockdown type which have been made available in the market have proved unsatisfactory either because the frames were not of sufficient strength or the assembly of the frames necessitated a comparatively extensive knowledge of carpentry and skill with tools.

Under the principles of the present invention a knock-down frame may be very readily constructed with the use of a few ordinary hand tools such as a hammer and a saw. Furthermore the resulting frame will be exceptionally rigid.

In order to more clearly present the principles of the invention, preferred embodiments are shown in the drawing. The finished frame 1 is composed of similar elements which will hereinafter be designated as corner members. Each corner member is composed of two leg sections 2 and 3 secured together at adjacent ends to form a rigid right angle corner.

The leg sections are generally rectangular in shape and properly proportioned to suit the purpose for which the particular frame is designed. If the frame is to be used for a glass window or for a section of screening to enclose a large outside area such as a porch, the frame must be made of relatively heavy stock.

The frame 1 herein described is suitable for a screen in the ordinary dwelling house window. One of the leg sections 2 of each corner member is preferably made substantially thicker than the other member 3 for reasons to be hereinafter more fully set forth. The thicker leg section 2 is preferably formed with a shallow rabbet 4 extending throughout the length thereof and presenting a shoulder 5. The rabbet is also continued transversely across one end of the leg section to present a shoulder 6 against which the inner face of the thin section 3 bears. The ends of the leg sections at the corner are held in overlapping engagement. The end face 7 of the thin section 3 is in alignment with the outside edge 8 of the thick section while the end face 9 of the thick section 2 is in alignment with the outside edge 10 of the thin section 3. Any suitable means may be used to secure the corner members. Preferably a transverse member extending through or part way into the material of the frame is used. Such means may be an ordinary bolt, a rivet, or a wood screw. As herein shown a wood screw 11 is employed, which passes through the thin section 3 and penetrates part way of the thick section 2. If desired glue may be added to the joint to give it added strength.

Practically all of the mill work necessary in preparing the corner members is completed at the manufacturing point. Furthermore the most difficult operation in the construction of an efficient screen frame is entirely completed before the article is sold namely the construction of a rigid corner joint. The leg sections of the completed corner members may be cut to the proper length at the manufacturing point to form a screen of standard size when the corner members are assembled.

A dealer who distributes the frames may have, therefore, a stock of frame parts which may be assembled into screens of standard dimensions without any cutting or fitting. There are, however, many instances where a standard size will not fit the particular location in question. To provide for such cases the leg sections of the corner members are cut to a length slightly greater than the maximum frame size which may be required. To fit the particular window or other location the leg sections are cut in any suitable way as by sawing with an ordinary hand saw to the required length, and thereafter the corner sections are assembled to form a finished frame.

To assemble the corner members the thin sections 3 of each member are superposed upon the adjacent thick sections 2 with the inner edge 12 of the thin sections bearing against the shoulder 5 formed by the rabbet 4 in the thick members 2. The overlying leg sections are of such length that the extreme end face 13 of each of the thin sections bears against the inner face 12 of the adjacent thin sections. At the same time the end face 14 at the extremity of the thick section 2 bears against the inner face 15 of the adjacent thick section. The width of the thin section is so proportioned that the outer faces 10 and 8 of the superposed thin section 3 and the thick section 2 respectively lie in the same plane. To secure the parts in permanent relation a plurality of short nails or brads are driven through the thin section to a substantial distance into the thick section.

It will be noted that the thin sections 3 and the thick sections 2 of each corner member lie in different planes. When the corner sections are assembled the thin sections 3 overlie the thick sections 2 and inasmuch as one of the sections occupies one of the planes and its co-operating thick section occupies the other plane, each of the sides of the frame when completed are of equal thickness and lie in the same plane thus producing a frame which is uniform in appearance and extremely rigid and durable.

When it is desired to construct the frame having two of its sides provided with grooves 16 which adapt the frame to slide upon runways provided for the purpose within the frame of the window, certain of the parts must be modified and slightly more mill work must be done at the manufacturing point. The thick sections of two opposite corner members are provided with a comparatively deep rabbet 17 which extends throughout the length of the thick section. The structure of the remaining elements composing the two opposite corner sections as well as the elements composing the remaining corner members remains the same. When the elements thus made are assembled the thin sections which are superposed upon the thick sections having the rabbets 17 therein, themselves constitute one of the walls of the groove. It will be noted that at two opposite corners of the frame thus formed the end face of the thick sections must be rabbeted as at 18 in order to complete the groove.

One of the important features of such construction is the incorporation of a thin member and a relative thick member along the sides of the frame. By so proportioning these members a very efficient union of the two may be made by driving the means which have been described as brads through the thin member and thence into the thick member. By so doing the point of the brad or other means used may penetrate to a substantial depth into the thick member thus insuring that the brads will not be drawn out or be bent laterally by forces applied to the frame. For the same reason the joint at the corners is exceptionally strong inasmuch as the point of the screw may penetrate deeply into the thick member and draw the thin member firmly thereagainst.

In the particular embodiments shown the thickness of the thin leg sections 3 is greater than the height of the rib formed by the rabbet 4. As a result of this a rabbet 19 is formed extending completely around the inner edge of the frame. The wire netting 20 may desirably be tacked or otherwise secured upon the face 21 of the rabbet 19. If a neat finish is desired a moulding not shown may be inserted in the rabbet covering the edge of the netting and filling the rabbet 19.

Having thus described the invention, what is claimed as new, and desired to be secured by Letters Patent, is:

1. A knock-down frame for screening and the like comprising four similar assembled corner members, each corner member comprising a thick leg section and a thin leg section extending at right angles thereto one of which is cut to the length of the finished frame minus its own width and the other to the width of the frame minus its own width, means to secure adjacent end portions of the leg sections together in overlying relation and means to secure each thin leg section upon a thick leg section of an adjacent corner member in superposed relation with the end of each thin leg section abutting the inner face of a thin leg section of the adjacent corner member thereby to form a rigid laminated frame.

2. A knock-down frame for screening and the like comprising four similar assembled corner members, each corner member comprising a thick leg section and a thin leg section extending at right angles thereto, a shallow rabbet along the side and end of the thick leg section of each corner member forming a rib thereon presenting a longitudinal shoulder and a transverse end shoulder, means to secure the adjacent ends of the thick and thin leg sections in overlying relation with the inside face of the thin section bearing against the transverse end shoulder of the rib on the thick leg section to maintain the leg sections in right angled relation, and means to secure the corner members together with the thin leg sections superposed upon the thick leg sections and with the side face of the thin leg section engaging the longitudinal shoulder of the rib upon the thick leg sections which may be varied in size by cutting the legs of the corner members to the required length.

In testimony whereof, I have signed my name to this specification.

NELSON T. ASH.